Nov. 7, 1939.     A. R. WURTELE     2,179,278
INTERNAL COMBUSTION ENGINE
Filed May 3, 1937
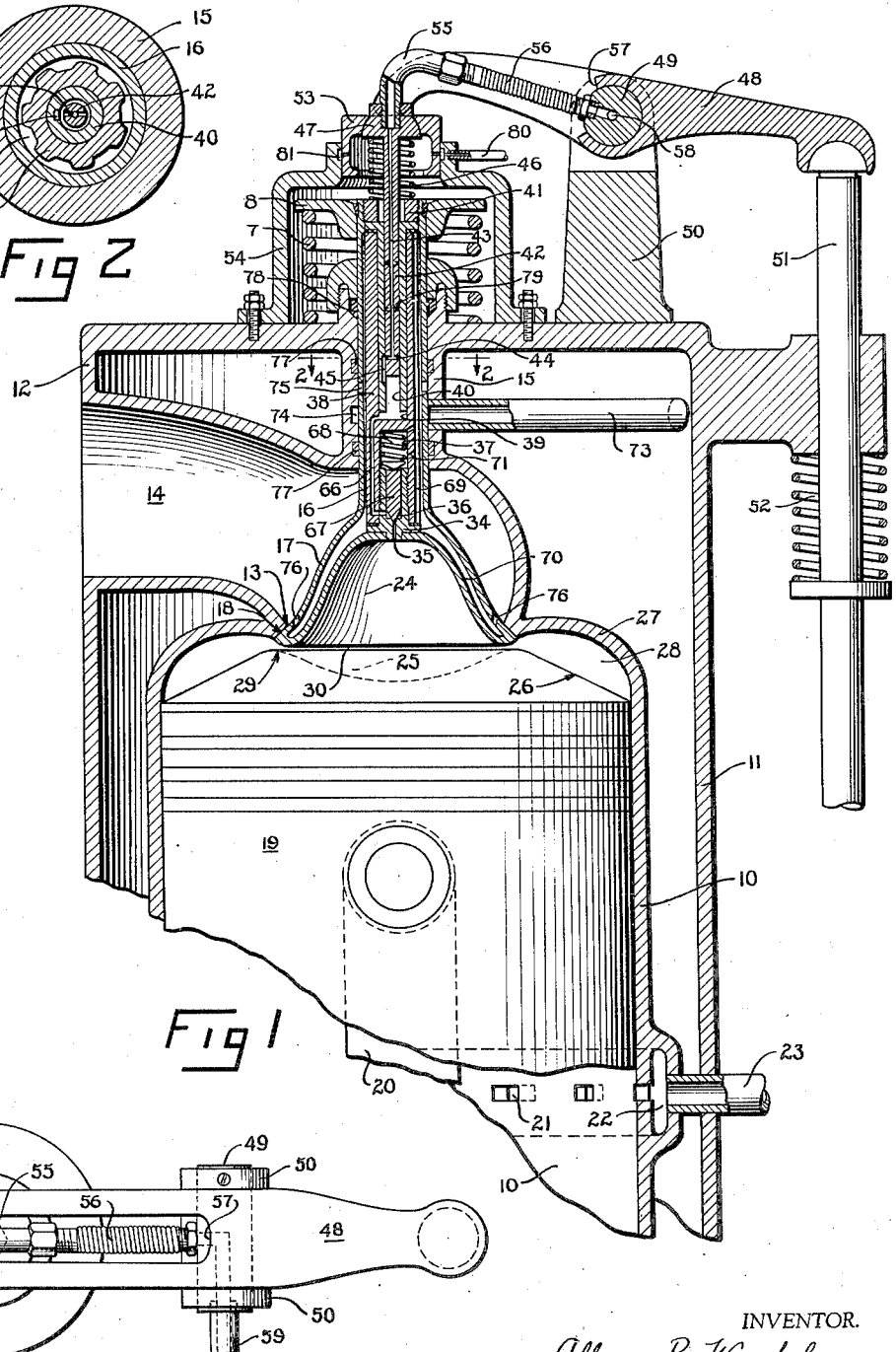

Patented Nov. 7, 1939

2,179,278

UNITED STATES PATENT OFFICE 2,179,278

INTERNAL COMBUSTION ENGINE

Allan R. Wurtele, Mix, La.

Application May 3, 1937, Serial No. 140,319

3 Claims. (Cl. 123—32)

This invention relates to internal combustion engines and more particularly to engines of the solid fuel injection type which are commonly known as Diesel engines.

Many different types of combustion chambers have been heretofore proposed for Diesel engines and many different means for injecting the fuel into the engine cylinder or combustion chamber have been provided, but none of these structures has given complete satisfaction, since it has been necessary to forego certain desirable features and results in order to obtain others. For example, in order to obtain high speed and flexibility by providing maximum turbulence and minimum ignition lag, it has been necessary to introduce substantial pumping and friction losses. When the latter are minimized in prior constructions, low turbulence, ignition lag and low combustion pressures are introduced and the maximum speed of operation is materially reduced. Open chamber engines of the types heretofore provided cannot operate at high speeds and refined high speed precombustion chamber engines operate with great pumping and friction losses and, hence, inefficiently. Furthermore, it has been found that said pumping and friction losses limit the maximum speeds attainable by the highest speed Diesels in production today.

It is accordingly an object of the present invention to provide an engine having a novel combustion space which meets the fundamental requirements for high speed Diesel engines.

Another object of the invention is to provide a Diesel engine wherein pumping and friction losses are minimized while, at the same time, high air turbulence, rapid ignition and, hence, high speed and flexibility are attained.

Still another object of the invention is to provide a novel combustion chamber in an internal combustion engine and novel means for injecting fuel into said chamber.

A further object is to provide a centrally disposed precombustion space in an engine cylinder which is so constructed as to permit of high speed operation with a minimum of friction and pumping losses.

A still further object is to provide an engine wherein the cylinder, piston and valve cooperate to form combustion spaces whereby the advantages of both the so-called open chamber and the precombustion or turbulence chamber are combined.

Another object is to provide a novel precombustion chamber engine wherein the entire force of the burning charge is exerted against the piston and not wasted in blasting, for example, as it is in precombustion chamber engines heretofore provided.

Still another object is to provide a novel valve which cooperates with the piston to form a precombustion chamber and embodies novel means for pumping fuel into said chamber.

Another object is to provide novel means for actuating a combined fuel pump and valve and for supplying fuel to said pump.

The above and further objects and novel features of the invention will more fully appear from the following detailed description when the same is read in connection with the accompanying drawing. It is to be expressly understood, however, that the drawing is for the purpose of illustration only and are not intended as a definition of the limits of the invention, reference being primarily had for this latter purpose to the appended claims.

In the drawing, wherein like reference characters refer to like parts throughout the several views, Fig. 1 is a side elevation, partly in section and with parts broken away, of one cylinder of an internal combustion engine embodying one form of the present invention;

Fig. 2 is a cross sectional view of the valve of Fig. 1, the section being taken substantially on line 2—2 of Fig. 1; and, Fig. 3 is a detail top plan view, with parts broken away, of the novel rocker arm and fuel supply means of Fig. 1.

The single form of the invention illustrated in the accompanying drawing, by way of example, is shown as being embodied in a two-stroke cycle, port scavenging, valve-in-head exhaust, solid fuel injection engine. The latter, in the form illustrated, comprises a cylinder 10 which is surrounded by a cooling water jacket 11 and has an integral head 12. The latter is provided with an exhaust port 13 that is preferably centrally disposed with respect to the longitudinal axis of cylinder 10, an exhaust gas passage 14 leading to a manifold (not shown) and a valve guide 15 for slidably receiving the stem portion 16 of a novel valve, the enlarged head portion 17 of which engages a seat 18 surrounding port 13 and controls the flow of exhaust gases through said port. The tubular stem of valve 16, 17 slidably extends through guide 15 and the head thereof is yieldingly held against seat 18 by any suitable means, such as coil spring 7 interposed between cylinder head 12 and a collar 8 secured in any suitable manner to the upper end of valve stem 16.

Slidably mounted in cylinder 10 is a piston 19 which is adapted to be connected to the engine crank shaft (not shown) for reciprocation thereby by means of a connecting rod 20. When the piston is near the bottom of its stroke, the same uncovers a plurality of tangentially directed openings 21 provided in the wall of cylinder 10 about the periphery thereof, which openings have communication with an annular air chamber 22 that is preferably connected with a suitable source of compressed air or other combustion supporting medium by one or more conduits 23. Thus, after each stroke of piston 19, a swirling column of air under pressure is injected into cylinder 10 through ports 21, said air being effective to drive the burned gases of combustion out through port 13 and passage 14 and to charge the cylinder with a fresh supply of air for supporting the combustion of the succeeding fuel charge which is injected through valve 16, 17, in a manner to appear hereafter.

The lower or head portion of valve 16, 17, the top of piston 19 and the walls of cylinder 10 are so formed as to provide novel main- and precombustion chambers whereby high turbulence and hence rapid and complete combustion of the fuel charge may be obtained with minimum pumping and friction losses and without necessitating an unnecessarily high compression ratio. The novel construction is also such that all of the force generated by the expansion of the burning charge is expended in driving the piston downwardly to do useful work. In the form shown, the enlarged, bell-shaped head 17 of valve 16, 17 is provided with a partially spherical cavity or recess 24 having a circular cross section, the lower end or mouth of said recess having the largest cross-section and being in open communication with cylinder 10. A sphere-like recess 25 having a maximum width substantially equal to the diameter of the mouth of recess 24 is preferably provided in the top center of piston 19, said recesses being adapted to cooperate, when the piston is at the top of its stroke, to form a precombustion chamber 24, 25, the curved walls of which do not interfere with or hamper the swirling motion and, hence, the turbulence of the combustion supporting medium into which the combustible charge is injected.

The upper peripheral margin of piston 19 is preferably bevelled as at 26 and cooperates with the rounded or curved upper wall 27 of cylinder 10 to form an annular main-combustion chamber 28. The bevel 26 starts at a point adjacent the edge of recess 25 thereby leaving an annular rib 29 between the bevelled portion and said recess, which rib closely approaches the lower periphery of valve head 17 when the piston is at top dead center and forms a narrow annular passage 30 connecting precombustion chamber 24, 25 and main-combustion chamber 28. It will be evident that the pumping losses which occur in engines wherein the compressed air must be driven through one or more comparatively small orifices into a precombustion chamber and the friction losses due to the flow of air and the burning charge through said restricted orifices are substantially eliminated and that the piston and bearing friction losses which vary directly with the compression ratio are minimized in an engine embodying the above-described combustion chambers which obviate the necessity for an extremely high compression ratio. Furthermore, a rich and turbulent mixture is provided in chamber 24, 25, the entire charge being initially mixed with only that portion of the combustion supporting medium which is in chamber 24, 25, thereby insuring prompt and unfailing ignition as well as rapid burning. The burning particles of the charge expand in a radial direction through annular opening 30, thereby creating very high turbulence in chamber 28 and causing a thorough mixture of said charge with the air in said chamber. Uniform fuel distribution and, hence, rapid and complete combustion thereof, are thus insured, and the entire force of the expanding gases is exerted at all times on the upper face of piston 19.

Novel fuel injecting means are provided for supplying fuel oil or other suitable combustible to chamber 24, 25, said means, in the form shown, comprising a nozzle 34 and novel pumping means mounted within valve 16, 17. Said nozzle is supported by the wall forming the face of said valve and has a small orifice 35 therethrough that connects a valve chamber 36 in the upper end of the nozzle with precombustion chamber 24, 25. Nozzle 34 is threadedly received by a bore 37 in the lower end of a cylindrical member 38, the bottom edge of which engages a soft metallic gasket, such as copper, provided on the upper surface of an external flange on said nozzle. The upper end of member 38 is also provided with a bore 39 which slidably receives a pump cylinder or barrel 40. A copper or like gasket is interposed between a flange on barrel 40 and the upper end of member 38 and the complete nozzle and pump barrel assembly is held in a central position in stem 16 by a tubular element 41 that is threaded into said stem and bears at its lower end against the flange on the top of barrel 40.

The movable element or piston of the fuel pumping means is constituted by a plunger member 42 which has a close sliding fit in barrel 40 and is centrally bored to provide a fuel passage 43 into which fuel may be injected in a manner to appear hereinafter. Passage 43 has communication with bore 39 below piston 42 through radial passages 44 and a groove 45 in the inner wall of barrel 40 when said plunger is at the upper end of its stroke, in which position the same is normally held by any suitable resilient means, such as a spring 46, that is interposed between the upper end of valve 16, 17 and an enlarged portion 47 of the plunger. A suitable one-way check valve may be provided in passage 43, 44, if desired.

Novel means are provided for actuating both piston 42 and valve 16, 17 in properly timed relation with respect to each other and without exerting any side thrust thereon. Said means preferably comprise a rocker arm 48 that is mounted for pivotal movement on a journal 49 which is supported by a bifurcated bracket 50. Arm 48 is adapted to be actuated by a push rod 51 which is, in turn, adapted to be reciprocated in a vertical direction by a suitably designed rotatable cam (not shown) in a manner well known in the art. Suitable resilient means, such as spring 52, is provided for yieldingly maintaining the lower end of rod 51 in engagement with said cam. The inner end of arm 48 is bifurcated (Fig. 3) and the ends of the two prongs thereof engage a piston-like guide member 53 which slidably extends into an opening in the upper end of a housing or guide 54 that is secured to cylinder head 12 and surrounds the upwardly projecting portions of valve 16, 17 and pump 40, 42. The central portion of member 53 engages the enlarged upper end of plunger 42, 47, and the lower edge of the depending flange thereof is adapted to engage the upper end of valve 16, 17 after a predetermined downward movement of said plunger by arm 48. Member 53 is provided with a central opening to permit of the attachment of a fuel supply conduit to plunger 42, 47 and the engaging surfaces of said member and plunger are preferably so curved as to permit the plunger to properly align itself in barrel 40 at all times.

Fuel oil is preferably supplied to pump 40, 42 by means of a flexible connection comprising an elbow 55 threaded into the upper end of plunger 42, 47 and a flexible conduit 56, such as flexible metallic tubing, secured at one end to elbow 55 and at its other end to journal 49 by any suitable coupling means. A slot 57 is provided at the hub of rocker arm 48 to permit movement of the latter relative to conduit 55, 56 and the latter communicates with a radially and axially extending passage 48 in journal 49 to which fuel is supplied by a suitable metering pump (not shown) through a conduit 59 (Fig. 3). Metered charges of fuel may thus be supplied to pump 40, 42 through conduit 59, passage 58, conduit 55, 56, passage 43, 44 and groove 45. As soon as the lower end of plunger 42 passes the lower edge of groove 45 on the down stroke of said plunger, a pressure is built up in chamber 39, 40 and fuel is forced through a passage 66 into chamber 36 at a point below the bevelled face of a piston-like valve member 67 which is normally held in position to close atomizing orifice 35 by a spring 68 housed in bore 37 of member 38. The pressure built up by pump 40, 42 is effective to lift valve 67 and permit fuel to flow through orifice 35 and be sprayed into chamber 24, 25. As soon as the movement of plunger 42 relative to valve 16 ceases, spring 68 becomes effective to immediately move valve 67 to its closed position.

For the purpose of cooling valve 16, 17 and the fuel pumping means therein, the diameter of member 38 is preferably somewhat less than the inside diameter of stem 16 thereby forming an annular chamber 69 in which a suitable cooling medium may be circulated and the walls of valve head 17 are cored, as at 70 to form a continuation of chamber 69. Cooling chamber 69, 70 may have communication through ports 71 with the interior of members 38, thereby permitting cooling fluid to come into direct contact with spring 68 and valve 67. The outer surface of member 38 is preferably provided with a plurality of fins or ribs, as best seen in Fig. 2, thereby increasing the surface area which is contacted by the cooling medium. The latter is introduced into chamber 69, 70 through a conduit 73, an annular groove 74 in guide 15 and a plurality of openings 75 in the wall of stem 16.

Preferably, openings 75 register with groove 74 only when valve 16, 17 is moved to open position by rocker arm 48 and air or a mixture of air and water is employed as the valve cooling medium. The air is discharged from the valve at high velocity through a plurality of ports 76 in valve head 17 thereby creating an ejector action which assists in removing burned gases from cylinder 10. If the cooling air is saturated or mixed with a small amount of water, the latter will turn to steam within the valve, thereby increasing the heat absorbing capacity of the cooling medium by an amount equal to the heat of vaporization of the water. The increase of pressure due to the creation of steam will also enhance the velocity at which the steam and air pass through ports 76 thereby increasing the ejector or suction effect thereof in removing burned gases from cylinder 10. To prevent leakage of the cooling medium between stem 16 and guide 15, suitable packing rings 77 and a stuffing box 78 may be provided.

If desired, a plurality of radial passages and annular grooves 79 may be provided in plunger 42. Fuel oil from passage 43 is thus permitted to lubricate the engaging walls of plunger 42 and barrel 40. The engaging walls of guide member 50 and housing 54 may be lubricated by oil supplied through a conduit 80 and an annular groove 81. The lubricating oil may pass through small passages in the flange of member 53 into housing 54 and returned to a sump by suitable means (not shown). Leakage from the pump 40, 42 is prevented by the metallic gaskets at each end of member 38, the latter of which may be made of aluminum alloy having a slightly higher coefficient of expansion than the metal of the other parts, whereby tight joints are insured when the valve is heated. The aluminum alloy also has high heat conductivity.

In the operation of an engine embodying the present invention, rod 51 is moved upwardly by a suitably designed cam when piston 19 reaches or nears top dead center position to thereby actuate pump plunger 42, 47 which forces a charge of fuel through nozzle 34 into precombustion chamber 24, 25, in the manner heretofore fully described. The fuel emerges from orifice 35 in the form of a fine spray and is ignited by the head of the compressed gases in the precombustion chamber, said air being in a highly turbulent state. Due to the turbulence and richness of the fuel and air mixture, ignition takes place with certainty and the burning is rapid. The gases of combustion expand against the face of piston 19 and some of the burning particles of fuel are driven radially and outwardly in all directions through passage 30 into main-combustion chamber 28 where said particles are thoroughly and evenly mixed with the air therein. Complete, rapid and progressive burning of all of the fuel particles, is thus insured and the entire force of the expanding gases is utilized in driving piston 19 downwardly to do useful work.

When power piston 19 nears the bottom of its stroke, valve 16, 17 is opened by continued movement of rod 51 and arm 48 and ports 21 are uncovered, said valve preferably being opened slightly ahead of the opening of said ports. Air enters cylinder 10 through tangential ports 21 from chamber 22 thereby setting up a swirling column of air which is effective to drive the burned gases out through port 13, said air being aided in the removal of said burned gases by air and steam emerging from ports 76 in a manner fully pointed out above. Just before ports 21 are again covered on the up-stroke of piston 19, spring 7 is permitted to move valve 16, 17 to closed position, thereby allowing a full, swirling charge of fresh air to enter cylinder 10 for supporting the combustion of the next charge of fuel oil. At the same time, plunger 42, 47 is moved to raised position by spring 46 for receiving another fuel charge from the metering pump.

During the continued upward movement of piston 19, the swirling motion of the air in cylinder 10 is not hampered in any way, the contours of the cylinder and chamber 24, 25 being conducive to such motion thereby assuring high turbulence when the fuel charge is injected. Additionally, the engine is not burdened with the necessity for pumping the compressed air into a precombustion chamber through one or more small orifices and the combined volumes of chamber 28 and 24, 25 are comparatively large, thereby providing a desirable compression ratio and minimizing the piston and bearing friction losses. As the piston nears the top of its stroke, another fuel charge is injected and the cycle of operation is repeated.

There is thus provided an internal combustion engine embodying novel combustion spaces which are so formed and disposed that high turbulence and rapid and complete fuel combustion are attained without the high pumping and friction losses which are attendant to said advantages in engines heretofore provided. Novel means are also provided for injecting fuel into a novel centrally disposed precombustion chamber formed by the cooperating faces of the exhaust valve and power piston, the latter structure permitting thorough, uni-flow scavenging of the power cylinder, uniform fuel distribution and non-interference with the turbulence of the combustion supporting air during the compression thereof. A novel means and method for cooling a valve are also provided.

Although only a single embodiment of the invention has been illustrated and described in detail, it is to be expressly understood that the same is not limited thereto, but that various changes may be made therein, particularly in the design and arrangement of parts illustrated, without departing from the spirit and scope of the invention, as will now be apparent to those skilled in the art. For a definition of the limits of the invention, reference will be had primarily to the appended claims.

What is claimed is:

1. In an internal combustion engine, a power cylinder, a cylinder head therefor having a centrally disposed port therein, a valve for said port having a recess in the face thereof, the innermost portion of said valve being in a plane adjacent the inner surface of said cylinder head, means for injecting fuel through said valve into said recess, a piston operable in said cylinder having a recess in the top thereof, said recesses having outlets which are of substantially equal area and being adapted to cooperate with one another to form a pre-combustion chamber when the piston is at the top of its stroke, and an annular main combustion chamber formed by the wall of said cylinder and the annular portion of the top of said cylinder around the recess in the latter, communication between said chambers being materially restricted when the piston is at top dead center.

2. In an internal combustion engine, a power cylinder, a cylinder head therefor having a centrally disposed port therein, a valve for said port having a recess in the face thereof, said recess being of circular section which has a maximum area at the mouth thereof, said mouth being adjacent the inner surface of the cylinder head when the valve is in closed position, means for injecting fuel through said valve into said recess, and a piston operable in said cylinder having a recess in the top thereof, the latter recess being of circular section having a maximum area at the upper surface of said piston and substantially equal to the maximum section of said first-named recess, said recesses being adapted to cooperate to form a combustion chamber when the piston is at the top of its stroke, communication between said chamber and said power cylinder being restricted when the piston is at top dead center.

3. In an internal combustion engine, a power cylinder, a cylinder head therefor having a centrally disposed port therein, a valve for said port having a recess in the face thereof, said recess being of circular section which has a maximum area at the mouth thereof, said mouth being adjacent the inner surface of the cylinder head when the valve is in closed position, means for injecting fuel through said valve into said recess, a piston operable in said cylinder having a recess in the top thereof, the latter recess being of circular section having a maximum area at the upper surface of said piston and substantially equal to the maximum section of said first-named recess, said recesses being adapted to cooperate to form a pre-combustion chamber when the piston is at the top of its stroke, and an annular main combustion chamber formed by the wall of said cylinder and the annular portion of the top of said piston surrounding the recess in the latter, said combusion chambers having restricted communication with each other when the piston is at the top of its stroke.

ALLAN R. WURTELE.